(12) United States Patent
Venkiteswaran

(10) Patent No.: US 7,756,750 B2
(45) Date of Patent: Jul. 13, 2010

(54) METHOD AND SYSTEM FOR PROVIDING ONLINE PROCUREMENT BETWEEN A BUYER AND SUPPLIERS OVER A NETWORK

(75) Inventor: Vaidhyanathan Venkiteswaran, West Chester, OH (US)

(73) Assignee: Vinimaya, Inc., Cincinnati, OH (US)

( * ) Notice: Subject to any disclaimer, the term of this patent is extended or adjusted under 35 U.S.C. 154(b) by 131 days.

(21) Appl. No.: 10/360,755

(22) Filed: Nov. 30, 2001

(65) Prior Publication Data

US 2005/0049938 A1    Mar. 3, 2005

(51) Int. Cl.
G06Q 30/00 (2006.01)
(52) U.S. Cl. .............................. 705/26; 705/1; 705/27
(58) Field of Classification Search .................. 705/1, 705/26, 27
See application file for complete search history.

(56) References Cited

U.S. PATENT DOCUMENTS

| | | | | |
|---|---|---|---|---|
| 5,712,989 | A * | 1/1998 | Johnson et al. | 705/28 |
| 6,119,101 | A * | 9/2000 | Peckover | 705/26 |
| 7,330,846 | B1 | 2/2008 | Dirisala et al. | |
| 2001/0034659 | A1 * | 10/2001 | Kobayashi | 705/26 |
| 2002/0038282 | A1 * | 3/2002 | Montgomery | 705/37 |
| 2002/0065744 | A1 * | 5/2002 | Collins | 705/27 |
| 2002/0077929 | A1 * | 6/2002 | Knorr et al. | 705/26 |
| 2002/0147656 | A1 * | 10/2002 | Tam et al. | 705/26 |
| 2002/0194208 | A1 * | 12/2002 | Knoll et al. | 707/204 |
| 2003/0030672 | A1 * | 2/2003 | Hughes et al. | 345/765 |
| 2003/0061122 | A1 | 3/2003 | Berkowitz et al. | |
| 2003/0084010 | A1 * | 5/2003 | Bigus et al. | 706/6 |
| 2003/0105681 | A1 * | 6/2003 | Oddo | 705/27 |
| 2003/0167209 | A1 * | 9/2003 | Hsieh | 705/26 |
| 2005/0027611 | A1 * | 2/2005 | Wharton | 705/26 |
| 2005/0261984 | A1 * | 11/2005 | Hutchison et al. | 705/26 |

OTHER PUBLICATIONS

"Glovia Rolls Out a Powerful, Web-Enabled Configuration Solution." Business Editors and High-Tech Writers. Business Wire. New York: May 16, 2001. p. 1. Retrieved via ProQuest on Feb. 27, 2010.* http://findarticles.com/p/articles/mi_m0EIN/is_2000_Nov_6/ai_66626613/, "Vinimaya Expands B2B e-Procurement Platform to 20 Verticals; B2B Marketplaces and Suppliers Can Join the Network to Instantly Reach Fortune 2000 Purchasing Managers," Business Wire, Nov. 6, 2000 (pp. 1-3).

http://findarticles.com/p/articles/mi_m0EIN/is_2000_Oct_11/ai_65946458/, "Vinimaya Partners with AnswerPal to Establish B2B Content Development Arm," Business Wire, Oct. 11, 2000, (pp. 1-2).

(Continued)

*Primary Examiner*—Jeffrey A. Smith
*Assistant Examiner*—Michael A. Misiaszek
(74) *Attorney, Agent, or Firm*—Finnegan, Henderson, Farabow, Garrett & Dunner LLP

(57) ABSTRACT

A request for shopping is placed from inside a procurement system. Intelligent agents are launched to retrieve information from catalog sources web-enabled over the internet or within the intranet. Retrieved catalog information is aggregated and associated with other data items. Business rules are applied to make decisions on what part of aggregated information will be rendered to User. Sorting/multi-level refining operations are enabled. The User selects one or more catalog results, whereupon an XML shopping cart is created and submitted to the procurement system through published interfaces. The procurement system is enabled to place an order on supplier web-enabled transaction system.

15 Claims, 2 Drawing Sheets

OTHER PUBLICATIONS http://findarticles.com/p/articles/mi_hb5932/is_200110/ai_n23885081/, Vinimaya Upgrades ViniSyndicate. (Brief Article)(Product Announcement), The Online Reporter, Oct. 15, 2001,(p. 1).

http://findarticles.com/p/articles/mi_hb3381/is_200011/ai_n8119940/, Vinimaya Inc. (business to business online shopping services), Purchasing, Nov. 16, 2000 (p. 1).

Vinimaya website screenshots, Vinimaya website, purported 2000, pp. 1-3.

http://kapowtech.com/index.oho/about-us, "About Kapow Technologies," Kapow Technologies website, 2009.

http://www.inc.com/inc5000/2008/company-profile.html?id=200836760, "Company Profile," Inc. 5000, 2009.

* cited by examiner

Figure 1: ViniSyndicate and Catalog Sources
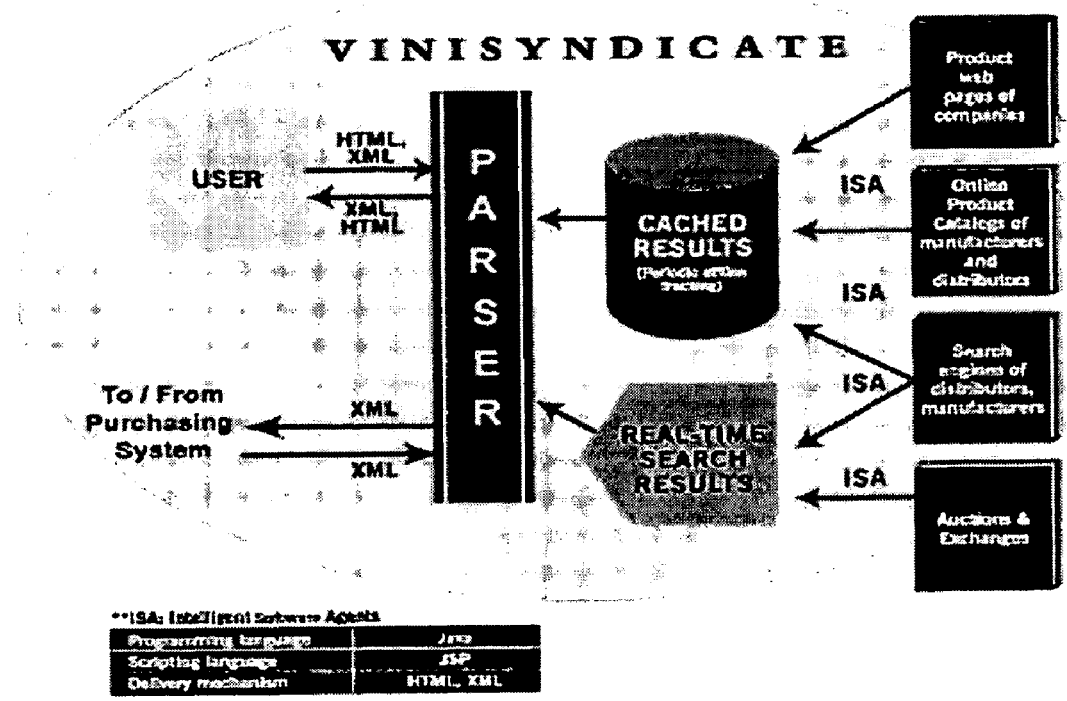

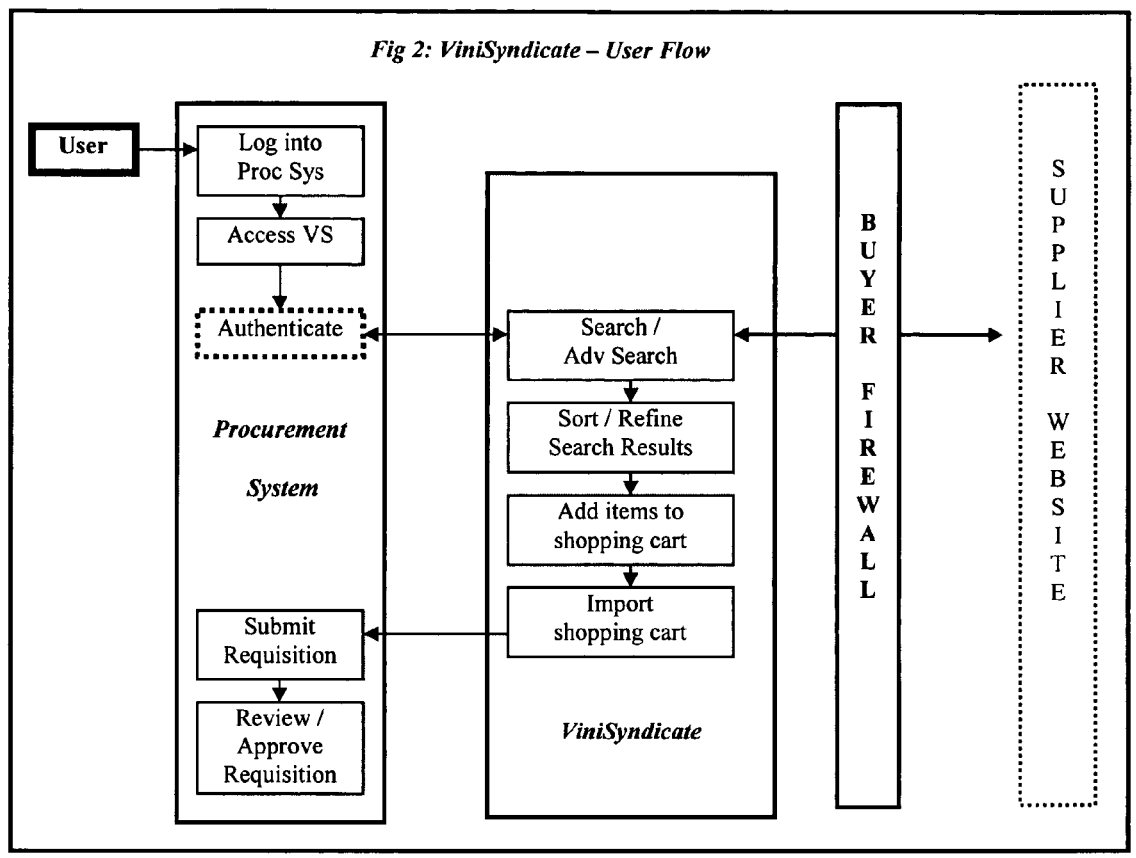
Fig 2: ViniSyndicate User flow:

METHOD AND SYSTEM FOR PROVIDING ONLINE PROCUREMENT BETWEEN A BUYER AND SUPPLIERS OVER A NETWORK

FIELD OF THE INVENTION

This invention relates to computer-based on-line procurement, where users of a buy-side procurement system can perform shopping from non-resident, distributed web-enabled catalogs.

DESCRIPTION OF RELATED ART

Lack of Supplier "electronic" Product Catalogs, or eCatalogs resident in buy-side procurement systems has created a seemingly insurmountable bottleneck for Buyers automating procurement and supply chain processes. Companies have implemented expensive buy-side applications only to discover that a mere fraction of their Supplier base can support their automation efforts without a substantial investment of both time and money. Thus, these companies may have only 5 or 10 Supplier eCatalogs resident in buy-side e-procurement systems, out of thousands of available Suppliers, limiting the number of transactions through these applications and becoming a significant hurdle in achieving their hoped-for return on investment.

Making matters worse, there are numerous manufacturers and distributors willing to provide their product information to their customers via eCatalogs. However, with multiple and disparate eCatalog formats (such as CIF, ebXML, xCBL and others), syndication approaches (e.g., OBI, cXML "punchout", technologies (e.g., XML, EDI), and taxonomies (e.g., UNSPSC, eClass) available, only a small minority of these Suppliers have the financial resources and technical skills to meet each customer's unique needs.

Although the majority of Supplier web sites have basic product information and list pricing, they can't meet the Buyer's requirements for aggregation and user interface standardization, buyer-specific attributes such as pricing, part numbers, UNSPSC codes, integration with their eProcurement system. The bottom line is the lack of supplier catalogs available to eProcurement Systems limits transaction liquidity, seriously affecting expected savings and ROI!

BRIEF SUMMARY OF THE INVENTION

The ViniSyndicate product is a unique combination of cutting-edge technology (Intelligent Agents) applied in an innovative process (Dynamic Syndication) to solve the problem of lack of buy-side resident eCatalogs. The innovative process involves a server-resident software system that links-up with buy-side procurement system, and utilizes Intelligent Agents to execute distributed search requests over the Internet to search for and securely access product, price, availability and other relevant content directly from Suppliers' web sites or eCommerce systems. With superior abilities to search, aggregate, customize, enhance, analyze, display and manage eCatalog content, ViniSyndicate meets the Buyer's needs, protects their current eProcurement investment and concurrently minimizes/eliminates effort for their Suppliers.

BRIEF DESCRIPTION OF THE SEVERAL VIEWS OF THE DRAWING

FIG. 1: ViniSyndicate and Catalog Sources, illustrates the kinds of catalog sources that ViniSyndicate can integrate to and the two models in which the catalog results can be made available to the end user (e.g. real-time and/or cached).

FIG. 2: ViniSyndicate User flow, illustrates how ViniSyndicate (hence forth referred to as VS) works in concert with the Buy-side procurement system.

DETAILED DESCRIPTION OF THE INVENTION

Vinimaya Inc. is a privately held software company with a focus to develop and bring to market innovative eBusiness software products based on Intelligent Agent Technology. Its products are based on over 3 years of R&D, are built upon standard technology platforms such as Java and XML, and are designed to be easy to implement, maintain and operate. Vinimaya's flagship product "ViniSyndicate" is a buy-side eCatalog Management System that uses Intelligent Agent Technology to extract dynamic, real-time product information directly from Suppliers' web sites as they exist today, without the need for "XML punchout" and other costly, invasive modifications. This document explains the motive, architecture and technologies behind the product ViniSyndicate developed and marketed by this company.

ViniSyndicate is a buy-side software solution, built on intelligent agent and XML technology, that enables a buy-side procurement system to be integrated with a supplier's web presence without the need for implementation of expensive sell-side punchout solutions by the supplier. A user on the buy-side procurement system would be able to dynamically convert catalog information resident on a supplier's web site (or other web-enabled sources) into an XML shopping cart that could be fetched into the procurement system.

The solution combines a rich user experience associated with shopping on a suppliers web site with the necessary buy-side control that a sourcing professional would need over what a general requisitioner would be allowed to purchase. The features include live catalog content from supplier's web site, use of Intelligent Agents for standardizing supplier catalog content, powerful, distributed search engine, dynamic XML cart generation, out-of-box integration with major procurement systems, catalog management tools addressing buy-side needs such as SKU restriction, UNSPSC codes and buyer part numbers, buyer specific product and pricing information, customizable User Interface with built-in Graphical User Interface (GUI) adaptors ViniSyndicate is a non-invasive approach to buyer-supplier relationship, using dynamic XML as a means of integration. This approach minimizes the time-to-deploy and time-to-ROI when compared to alternate approaches. The ViniSyndicate Dynamic Syndication functionality allows users to take advantage of supplier hosted catalogs directly from the supplier's web site. The system provides transport and translation of data from the supplier to buy-side procurement system. It is written in Java and XML, runs on both Microsoft and Unix server platforms, and is compatible with all leading web application servers. ViniSyndicate's unique functionality is derived by combining five major components into a single, integrated, highly scalable software application. Listed below are the five major components of ViniSyndicate . . . .

Component #1 is the Intelligent Agent Engine which retrieves product information, pricing, availability and other relevant information in real-time, directly from Suppliers' web sites, eCommerce systems or other web-accessible sources using secure, standard open-system HTTP/HTTPS protocol Component #2 is the Distributed Remote Search Engine, which performs remote searches on web-enabled, non-resident, distributed catalog sources. Also uses multi-tier searching techniques, which can utilize supplier web site search engine or configurator and supports parametric searching with relevancy.

Component #3 is the Parsing Engine, which turns unstructured, multi-format web site content into aggregated, structured eCatalogs and has a flexible, user-defined data structure Component #4 is the eCatalog Engine which is Configurable and customizable and allows buy-side to define attributes, navigation, add buyer part numbers, UNSPSC codes, custom pricing including buy-side to add discounts, price breaks Component #5 is the XML Engine used for storing, reading, parsing, mapping and rendering and syndicating XML (eXtensible Markup Language) "documents" and integrates seamlessly with published interfaces from leading buy-side eProcurement products from Ariba, Oracle, SAP, etc. via published XML interfaces such as cXML and OCI Implementing ViniSyndicate gives Buyers can implement supplier catalogs in days versus months or even years. ViniSyndicate is a unique, robust and cost-effective eCatalog solution that simplifies and accelerates Supplier participation, quickly increasing transaction liquidity and driving return-on-investment! They can quickly aggregate eCatalogs from hundreds (if not thousands) of Supplier catalog sources which will increase "transaction liquidity" and drive savings. ViniSyndicate fully integrates with leading buy-side eProcurement and Supply Chain Management Products "out-of-the-box".

Also, companies now get robust eCatalog management capabilities with less cost, less complexity because ViniSyndicate eliminates the need (and costs) for maintaining a large internal eCatalog data warehouse, eliminates data-transformation" costs (range from $4 to $10 per catalog line item) and requires less hardware, software, storage, outside services, people required than conventional solutions.

For Suppliers' participation in a customer's eProcurement program is simplified because there are almost no technical requirements for them when compared to conventional solutions. ViniSyndicate Intelligent Agents build a powerful bridge between the Buyers' eProcurement platforms (e.g., Ariba Buyer, SAP B2B, Oracle iProcurement, etc.) and Suppliers' web sites and other eCommerce systems. This leverages the Suppliers' existing eCommerce environment, without requiring additional investment and extensive effort on their part to meet each Buyer's specific eCatalog needs. (Estimates for punchout-enabled web sites >$100,000 per site). No need for Suppliers to support dozens of catalog formats—cXML, xCBL, EDI 832, etc. Immediate buy-side access to "real-time" information such as product availability and inventory overruns Despite using the supplier's web site, the Buyer still controls the process and can configure and administer the eCatalog user interface, add or remove catalogs quickly and easily, and add their own Buyer-specific, value-added information—part numbers, contract pricing, etc.

Intelligent Agents are software entities that can act on behalf of a user or a system. Simply put, the central idea underlying Intelligent Agents is "delegation". Most Intelligent Agent-based software applications in use today are designed to find and filter information, automate tasks, and communicate with systems, much like an end user would. They can be found in many of the Internet search engines in use today (e.g., Google, Ask Jeeves) as well as in many network management systems (e.g., CA Unicenter). These types of agents are designed to be very task-specific and work in a well-defined environment.

The class of Intelligent Agents used in Vinimaya's products goes to the next level of performance and capability. In addition to being able to perform the aforementioned tasks (find and filter data, automate processes, etc.), the agents are now able to apply rules within the domain of their application. This capability allows the agents to deal with the non-standard and unstructured world of B2B eCommerce, where inconsistent data formats, disparate protocols, incompatible systems and subjective information is the norm. Additionally, Vinimaya products are considered "multi-agent systems", which means that the agents can collaborate with other agents within the environment—a very complex concept to implement into a commercial product—it is also very powerful when efficiency, speed and accuracy are the priority, which is always the case in B2B eCommerce.

In their current application in Vinimaya's ViniSyndicate eCatalog Management System, the Intelligent Agents are configured to interact with Supplier web sites and eCommerce systems on behalf of the Buyer, automating the locating, translating, enhancing and organizing of product information as required by the Buyer's eProcurement system. This real-time approach is significantly easier and faster to deploy than today's current static data-intensive approaches.

A User on the browser-based procurement system could get to VS by clicking on an external catalog source link named ViniSyndicate (Most procurement systems provide this functionality to access an external catalog source). Once in VS, the User can search across multiple supplier catalogs categorized under standard commodity groups. The search results could be sorted, and the User can refine the set of results to find exactly what he/she is looking for. The User can then add the items to a shopping cart, and can either continue shopping on VS or return back with the cart into the procurement system. Once back on procurement system, the User proceeds with the usual workflow associated with creating a purchase requisition for approval.

GLOSSARY

Java™—Java is a programming language expressly designed for use in the distributed environment of the Internet. It was designed to have the "look and feel" of the C++ language, but it is simpler to use than C++ and enforces an object-oriented programming model. Java can be used to create complete applications that may run on a single computer or be distributed among servers and clients in a network. It can also be used to build a small application module or applet for use as part of a Web page.

JavaBeans™—The JavaBeans component architecture is the platform-neutral architecture for the Java application environment. It's the ideal choice for developing or assembling network-aware solutions for heterogeneous hardware and operating system environments—within the enterprise or across the Internet. The JavaBeans component architecture extends "Write Once, Run Anywhere™" capability to reusable component development. Software components that use JavaBeans are thus portable to containers including Internet Explorer, Visual Basic, Microsoft Word, Lotus Notes, and others. The JavaBeans specification defines a set of standard component software APIs for the Java platform.

JavaServer Pages™ (JSP™)—JavaServer Pages technology is aimed at creating WebPages that are information rich and dynamic. JavaServer pages technology is an extension of the Java™ technology. JSP technology enables rapid development of web-based applications that are platform independent. JavaServer Pages technology separates the user interface from content generation enabling designers to change the overall page layout without altering the underlying dynamic content. JavaServer Pages technology uses tags and scriptlets written in the Java programming language to encapsulate the logic that generates the content for the page. Additionally, the application logic can reside in server-based resources like JavaBeans™ component architecture. By separating the page logic from its design and display and supporting a reusable component-based design, JSP technology makes it faster and easier than ever to build web-based applications.

Java Database Connectivity (JDBC)—JDBC is an application program interface (API) specification for connecting programs written in Java to the data in popular database technologies.

Structured Query Language (SQL)—SQL is a language used to interrogate and process data in a relational database. Originally developed by IBM for its mainframes, all database systems designed for client/sever environments support SQL. SQL commands can be used to interactively work with a database or can be embedded within a programming language to interface to a database. Programming extensions to SQL have turned it into a full-blown database programming language.

HyperText Markup Language (HTML)—HTML is the set of markup symbols or codes inserted in a file intended for display on a World Wide Web browser page. The markup tells the Web browser how to display a Web page's words and images for the user. Each individual markup code is referred to as an element or tag. Some elements come in pairs that indicate when some display effect is to begin and when it is to end. HTML is a formal Recommendation by the World Wide Web Consortium (W3C) and is generally adhered to by the major browsers, Microsoft's Internet Explorer and Netscape's Navigator, which also provide some additional non-standard codes.

Extensible Markup Language (XML)—XML is a set of rules for defining semantic tags that break a document into parts and identify the different parts of the document. It is a meta-markup language that defines a syntax used to define other domain-specific, semantic, structured markup languages and provides a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML. Any individual or group of individuals or companies that wants to share information in a consistent way can use XML.

JavaScript—JavaScript is the scripting language of the Internet. It is the most popular scripting language on the World Wide Web and is used in millions of Web pages to power rich, interactive content and increasingly powerful web applications. JavaScript is the "glue" that binds together HTML and XML elements accessed through the browser's Document Object Model (DOM), JavaScript scripts, Java applets, and plug-ins and allows these objects to communicate and interoperate. JavaScript can be used both on the client (CSJS) and on the server (SSJS). The JavaScript language can also be used across browsers, applications, platforms, and devices, making it the language of choice for building next-generation web applications.

The invention claimed is:

1. A computer implemented method for providing online procurement between a buyer and suppliers over a network, comprising:

receiving, by a procurement processor configured to provide online procurement between the buyer and suppliers, user-initiated catalog shopping requests from a first procurement system and a second procurement system over the network, wherein each catalog shopping request includes inter-related sub-requests and the first procurement system is configured to accept information in a first format type and the second procurement system is configured to accept information in a second format type;

determining, by the procurement processor, for each sub-request, one or more intelligent agents for searching supplier Web site catalogs;

determining, by the intelligent agents of the procurement processor, one or more sub-agents for searching the supplier Web site catalogs;

searching non-invasively, by the intelligent agents and the one or more sub-agents of the procurement processor, the supplier Web site catalogs for supplier product information responsive to the catalog shopping requests;

retrieving, in real-time, by the intelligent agents and the one or more sub-agents of the procurement processor, product information from the supplier Web site catalogs without requiring the supplier Web sites hosting the Web site catalogs to include specific software designed to support the search and retrieval, wherein the product information is multi-formatted;

translating, in real-time, by the procurement processor, the multi-formatted product information;

parsing, in real time, by the procurement processor, the translated product information into aggregated structured product information;

modifying, in real-time, by the procurement processor, the aggregated structured product information based on one or more rules defined by the procurement systems;

organizing, in real-time, by the procurement processor, a selected portion of the modified product information into a form integratable with the procurement systems; and providing the modified product information to the procurement systems to enable each procurement system to submit a respective requisition request for selected products offered by one or more of the suppliers.

2. The method of claim 1, wherein a first supplier supports a first type of Web site catalog format, and a second supplier supports a second type of Web site catalog format that is different from the first type of Web site catalog format.

3. The method of claim 1, wherein a first supplier supports a first type of Web site catalog format, and the at least one of the first and second procurement systems operates with a second type of Web site catalog format that is different from the first type of Web site catalog format.

4. The method of claim 1, wherein organizing, in real-time, a selected portion of the modified product information includes:

creating, by the procurement processor, a shopping cart in a format compatible with at least one of the first and second procurement systems; and sending, by the procurement processor, the shopping cart to the procurement system in response to a request from the procurement system.

5. The method of claim 4, wherein the shopping cart is formatted as determined by the at least one of the first and second procurement systems.

6. The method of claim 1, wherein parsing, in real-time, the translated product information into aggregated structured product information includes:

processing differently formatted product information from one of more of the Web site catalogs and creating a single view of the product information in an aggregated, structured format.

7. The method of claim 6, wherein modifying, in real-time, the aggregated structured product information includes:
appending to the aggregated structured product information at least one of part numbers, contract pricings, and UNSPSC codes specified by a user of the at least one of the first and second procurement systems.

8. A system for providing online procurement, comprising:
a computer system connected to a network that is also connected to a first procurement system, a second procurement system, and Web sites of suppliers that provide Web site catalogs of products offered by the suppliers, wherein the computer system further includes an interface for receiving user initiated catalog shopping requests from the first procurement system and the second procurement system over the network, wherein each catalog shopping request includes inter-related sub-requests and the first procurement system is configured to accept information in a first format type and the second procurement system is configured to accept information in a second format type, the computer system further including:
an intelligent agents engine that launches intelligent agents for searching and retrieving, in real-time, supplier product information from the supplier Web site catalogs over the network, wherein at least one of the intelligent agents launch one or more sub agents that assist in the searching and retrieving the supplier product information, and wherein the supplier product information retrieved from the supplier Web site catalogs is in multiple formats, and wherein the intelligent agents retrieve the product information from the supplier Web sites without requiring a software program designed to support the retrieval to be resident in the supplier Web sites;
a parsing engine that translates the multi-formatted supplier product information into aggregated structured product information that is accessible by at least one of the first and second procurement systems via a respective user interface in a single view;
a catalog engine that receives selections from a user of at least one of the first and second procurement systems for modifying the aggregated structured product information to include custom data related to the products identified in the supplier product information; and
a communication engine that provides an interface for at least one of the first and second procurement systems to retrieve the aggregated structured product information, and seamlessly sends the online documents to the at least one of the first and second procurement systems such that the at least one of the first and second procurement systems create a requisition for at least one of the supplier products identified in the online documents.

9. The system of claim 8, wherein a first supplier supports a first type of Web site catalog format, and a second supplier supports a second type of Web site catalog format that is different from the first type of Web site catalog format.

10. The system of claim 8, wherein a first supplier supports a first type of Web site catalog format, and at least one of the first and second procurement systems support a second type of Web site catalog format that is different from the first type of Web site catalog format.

11. The system of claim 8, wherein the supplier product information includes product information, pricing regarding products offered by the suppliers, and availability information reflecting the availability of products offered by the suppliers.

12. The system of claim 8, wherein the intelligent agents and one or more sub-agents retrieve the supplier product information in response to at least one of the shopping requests.

13. The system of claim 8, wherein the communication engine creates a shopping cart in a format compatible with at least one of the first and second procurement systems and sends the shopping cart to the at least one of the first and second procurement systems in response to a request from the at least one first and second procurement systems.

14. The system of claim 8, wherein the parsing engine processes differently formatted product information from one of more of the Web site catalogs and creates a single view of the product information in an aggregated, structured format.

15. The system of claim 14, wherein the catalog engine performs at least one of:
adding or removing one or more of the electronic catalogs in response to a request from a user of the procurement system; and
adding at least one of part numbers, contract pricings, and UNSPSC codes specified by a user of at least one of the first and second procurement systems.

* * * * *